June 4, 1957  J. J. OPIEKON  2,794,210
SAUSAGE STUFFING MACHINES
Filed June 21, 1954  2 Sheets-Sheet 1
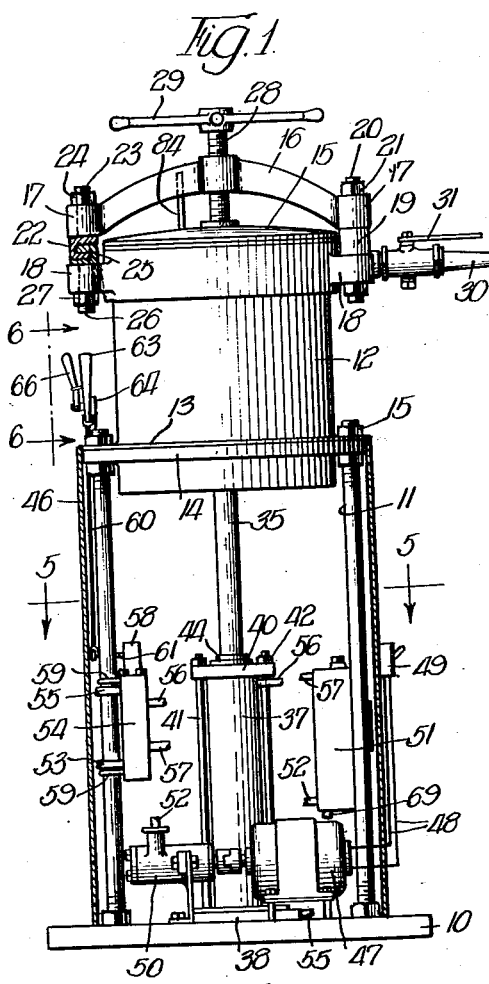
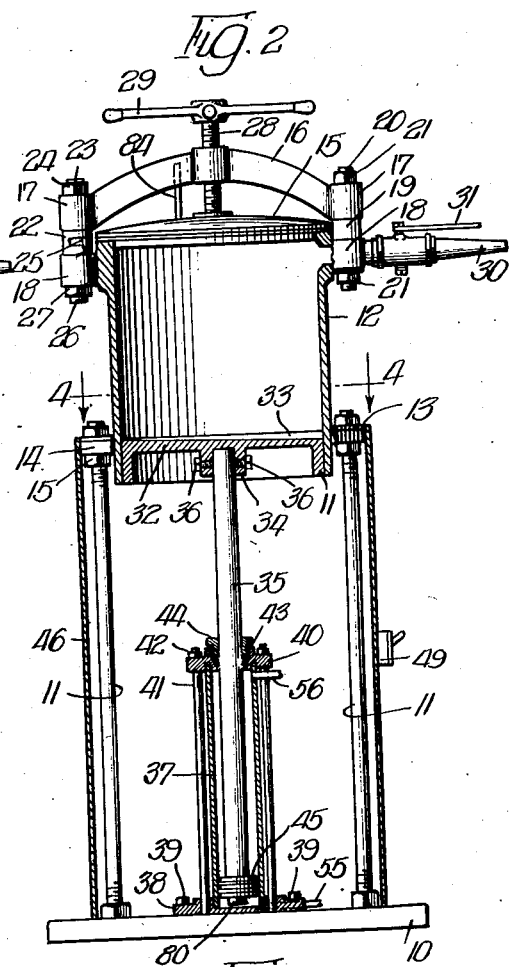
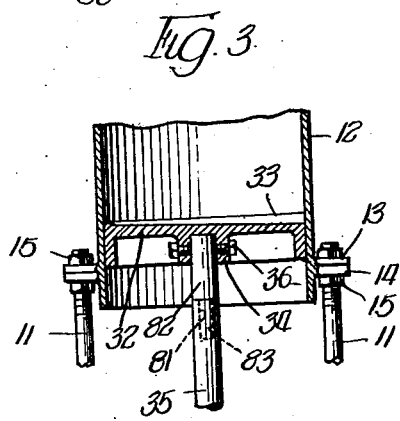
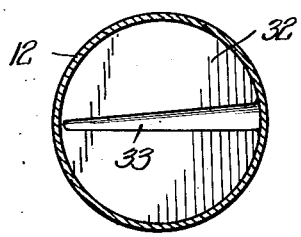
INVENTOR.
John J. Opiekon,
BY June 4, 1957  J. J. OPIEKON  2,794,210
SAUSAGE STUFFING MACHINES
Filed June 21, 1954  2 Sheets-Sheet 2
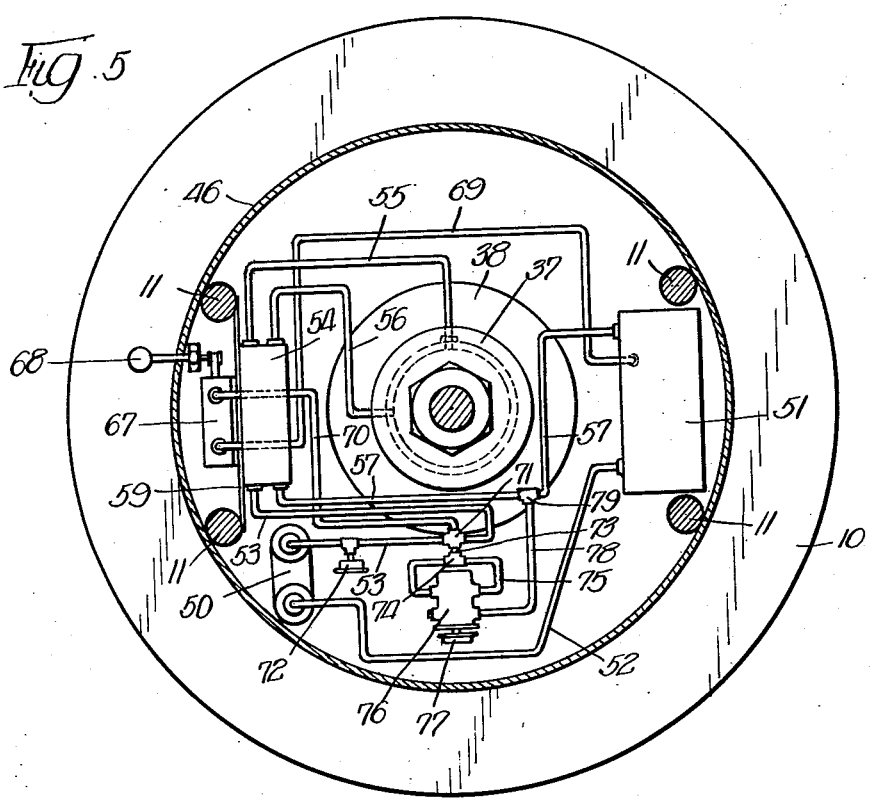
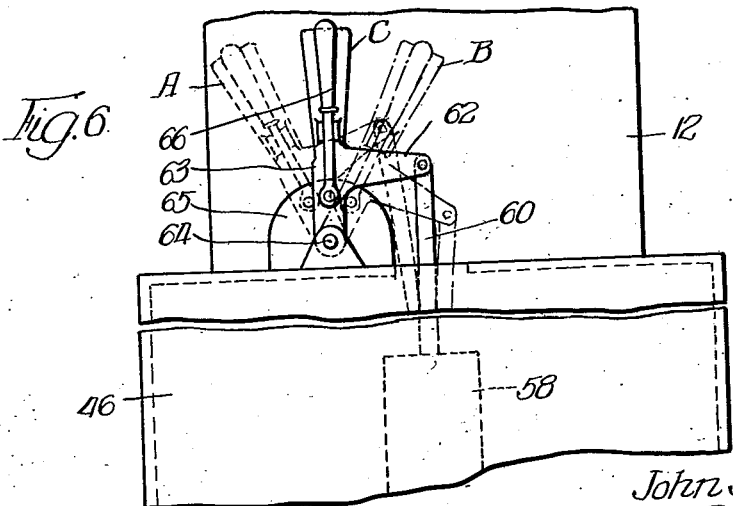
INVENTOR.
John J. Opiekon,
BY B. Pelechowicz
atty.

United States Patent Office 2,794,210
Patented June 4, 1957

2,794,210

SAUSAGE STUFFING MACHINES

John J. Opiekon, Chicago, Ill.

Application June 21, 1954, Serial No. 437,926

2 Claims. (Cl. 17—39)

The present invention relates to that type of food processing machinery normally employed in stuffing sausages, but as the description proceeds it will be seen that other applications are possible.

One problem inherent in the manufacture and use of food machinery is the prevention of contamination of the food, through the function of the machinery itself. The problem becomes particularly acute in stuffing sausages and the like, where a relatively high pressure must be maintained on the food itself. Since the usual mechanism employed to maintain this pressure is hydraulic, oil and lubricating fumes often find their way into the food chamber.

The invention has as a principal object the supplying of meat and the like, under pressure, insulated from inherent sources of contamination.

Another object of the invention contemplates a meat stuffer which is mechanically loaded at the outset of its operating cycle and thereafter requires no external source of power until the meat chamber is exhausted and refilled.

An additional object of the invention is to provide a meat stuffer of an inexpensive design which can be motor-driven or manually operated with a like degree of uniformity in performance.

Another object of the present invention is the provision of a chamber receivable of a quantity of meat or other ground food product, with which discharge tube or nozzle connects, with means provided in the said discharge chamber to press upon the contents of the said chamber in order to discharge the same from the nozzle into sausage casing or the like.

Another object of the present invention is the provision of a piston positioned within said chamber for reciprocating motion therewithin for alternately pressing upon the contents of the chamber for the purpose hereinabove indicated and returning to its initial inoperative position preceding the refilling of said chamber.

Another object of the present invention is the provision of suitable hydraulic means for imparting to said piston reciprocating motion, which means may be actuable by shifting of a suitable switch which controls a two-way valve whereby the flow of a fluid, such as oil, may be caused to flow at will in one or opposite direction so as to impart a reciprocating motion to said piston.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views, Fig. 1 is a side elevational view of the present device, with some parts thereof shown in sections;

Fig. 2 is a vertical cross sectional view thereof;

Fig. 3 is a fragmentary cross sectional view of the lower portion of the food chamber showing the manner of rendering piston rod longer than necessary for normal operation, for the purpose that will be later apparent;

Fig. 4 is a cross sectional view on a transverse plane through the food chamber, showing the detail of construction of the operative end of the piston, the view having been taken on line 4—4 of Fig. 2;

Fig. 5 is an enlarged cross sectional view of somewhat of diagrammatical nature, showing the hydraulic mechanism for imparting a reciprocating motion to the piston rod, the view having been taken substantially on line 5—5 of Fig. 1; and Fig. 6 is an enlarged, face elevational view of the switch for actuating a two-way valve for alternately changing the direction of the flow of the fluid in the hydraulic mechanism for reciprocating the piston rod, the view having been taken along the plane indicated by lines 6—6 of Fig. 1.

Referring in detail to the present drawings the device disclosed includes base 10 from which a pluarity of parts 11 extends in an upright direction. The meat or other food receiving chamber includes a cylindrical casing 12, adjacent the lower end of which a horizontal flange 13 outwardly projects. Ring 14 is disposed below said flange 13. Passed through said flange 13 and ring 14 are the upper threaded ends of parts 11, upon which said flange 13 and ring 14 are supported and held in a clamped position by means of a pair of nuts 15 which are in a threaded relation with the upper ends of said parts 11.

Normally superimposed over the upper end of said cylindrical casing 12 is closure 15. The means to hold said closure 15 in a rigid engagement with said cylindrical casing 12 includes an arcuate bar 16 which remains in a diametrical relation with said closure 15 during the operative position of the latter with respect to said cylindrical casing 12.

The ends of said bar 16 extend beyond the wall of said cylindrical casing 12 and terminate in eyes 17. Extending laterally from the cylindrical casing 12, in a diametrical relation therewith is a pair of integrally formed eyes 18. Said eyes 17 and 18 are in an alined relation when said bar 16 is in its operative position as shown in Figs. 1 and 2. Interposed between one of said eyes 17 and one of said eyes 18 is spacer 19. Passed through said latter eyes 17 and 18 and said spacer 19 is bolt 20, the ends of which are threaded for the purpose of receiving nuts 21. Said latter eyes 17 and 18, spacer 19 and said bolt 20 define a hinge upon which said bar 16 is adapted for horizontal swinging movement to its inoperative position.

The opposite eye 17 is adapted to receive a hooked latch member 22 depending from bolt 23, the latter to receive nut 24 in a threaded relation for rigidly supporting said latch member 22 with said last named eye 17. The opposite eye 18 is adapted to support a hooked latch member 25 from which an integrally formed threaded bolt 26 projects, the free end of which receives nut 27 for maintaining said hooked latch member 25 in a rigid relative position with said latter eye 18.

When said bar 16 remains in its operative diametric relation with said closure 15 said last named eyes 17 and 18 remain in alinement with latch members 22 and 25 interconnected, as seen in Fig. 1, for preventing the disengagement of said bar 16 from said closure 15.

Passed in a central relation through said bar 16 is a pressure screw member 28, the upper free end of which has a plurality of radially extending arms 29 defining a handle for the purpose of imparting a rotary movement to said screw member 28 for driving the latter to or away from said closure 15. When said latch members 22 and 25 remain in their operative position, as seen in Figs.

1 and 2, and the screw member 28 is driven against said closure 15, the said screw member 28 will exert a strong pressure from an upward direction against said closure 15 for maintaining the same in a firm contact with the upper end of said cylindrical casing 12 and forming a seal therewith.

Nozzle 30, for receiving sausage casings, connects with the upper end of said cylindrical casing 12, in the very near proximity of said closure 15. A valve operating handle 31 operates a valve in said nozzle for selectively opening or shutting off the latter as sausage casings are periodically removed from said nozzle after they have been filled.

Receivable within said casing 12 through the lower end thereof for reciprocating vertical sliding movement therewithin is piston 32. Formed at the inner end of said piston 32 is a diametrical gradually flaring out recess 33, with the wider end disposed in alinement with the opening made in said cylindrical casing 12 communicating with said nozzle 30 whereby food contents within said cylindrical casing 12 above said piston 32 may be directed toward the opening in communication with said nozzle 30 as said piston 32 approaches said closure 15 upon its upward stroke.

Downwardly depending from said piston 32 in a central relation therewith is hollowed stud 34 defining a socket for reception therewithin of the upper end of piston rod 35. A plurality of radially passed screws 36 engage said piston rod 35 for operatively connecting the same with said piston 32.

By the opposite end said piston rod 35 enters cylinder 37, the lower end of which is supported upon base 38, the latter affixed in a central relation with base 10 by means of a plurality of screw bolts 39.

The upper end of said cylinder 37 is closed by cover 40, through which a plurality of rods 41 is passed. The lower ends of said rods 41 are supported in said base 38, while the upper ends receive nuts 42 in a threaded relation for clamping said cylinder 37 between said base 38 and said cover 40.

Said cover has a central opening for permitting passage of said piston rod 35 into said cylinder 37. Packing 43, maintained in position by a threaded plug 44 for engaging said cover 40, provides a seal for preventing the escape of fluid from said cylinder 37 past said piston rod 35.

Connected with the lower end of said piston rod 35 is piston 45 positioned within said cylinder 37 for sliding motion.

Supported upon said base 10 and in an encompassing relation with flange 13 and ring 14 is cylindrical wall 46 enclosing said cylinder 37 and the lower end of cylindrical casing 12, as well as the mechanism for imparting reciprocating movement to said piston rod 35 hereinafter described. A hinged door (not shown) may be provided for said cylindrical wall 46 to afford access to the space below cylindrical casing 12 and to the hydraulic mechanism for imparting a reciprocating movement to said piston rod 35.

Supported in any suitable manner upon base 10 is an electric motor 47. Upon the electric circuit to operate said motor 47 is a pair of wires 48 extending from said motor 47 through said cylindrical wall 46 and passed to switch 49 supported in any suitable manner outwardly of and upon said cylindrical wall 46.

Centrifugal pump 50, supported upon said base 10 is operated by means of said motor 47, the latter being shown in Fig. 1, but omitted from Fig. 5.

A fluid reservoir 51 is supported in any suitable manner in an elevated position above said base 10 and within said cylindrical wall 46. An inlet pipe 52 connects the lower end of said reservoir 51 and pump 50. A discharge pipe 53 connects pump 50 with a two-way valve, generally indicated by 54. Pipe 55 leading from a two-way valve 54 connects with the lower end of cylinder 37, through base 38, as is seen in Figs. 1, 2 and 5.

Pipe 56 connects the two-way valve 54 with the upper end of cylinder 37.

Pipe 57 connects the two-way valve 54 with the upper end of reservoir 51.

Referring now in a greater detail to the construction and operation of the two-way valve 54, the same includes a slide member 58 positioned within the casing of said slide valve 54, the latter being supported by brackets 59 connected with a pair of posts 11. Said slide member 58 is operable by means of rod 60 positioned vertically for shifting movement, and connecting by its lower end to link 61, the latter in a rigid association with the upper end of said slide member 58.

The upper end of said rod 60 extends through said ring 14 and flange 13 and pivotally connects to laterally extending arm 62 of lever 63, the lower end of which is pivoted at 64 to arcuate plate 65, upon which said lever 63 is adapted for angular shifting movement as is seen in Fig. 6. A spring actuated latching bar 66 carried by said lever 63 and co-acting with the rim of said plate 65 is adapted to lock said lever 63 in its angular adjusted relation with said plate 65.

As is seen in Fig. 6 said lever 63 is capable of threefold angular shifting movements. In its position farthest to the left as is indicated by A arm 63 is raised upwardly to the farthest extent, with rod 60 extended in the upright direction to the greatest extent. In the position at C of said lever, arm 62 remains at a horizontal position, and in that latter position rod 60 remains in the neutral position. When lever 63 is extended to the farthest extent to the right, position at B, arm 62 is shifted angularly to the lowermost extent, with rod 60 shifted in a downward direction as far as the same will go.

As is obvious lever at position A will bring about the utmost upright shifting of the slide member 58 within the two-way valve 54, with lever at position B shifting said slide member 58 to the lowermost direction within said two-way valve 54, with slide member 58 remaining at an intermediate point of the two extreme positions mentioned when said lever is at position C.

No detailed description of the two-way valve 54 or its cooperating slide member 58 is required, because the same are quite well known in various arts, both as to their construction and operation. Suffice it to say that slide member 58 at its portion within the casing of the two-way valve 54 is provided with a plurality of channelled passages in order to interconnect two or more of pipes 53, 55, 56 and 57, depending upon the requirement of the ultimate operative result of the hydraulic mechanism for the purpose of imparting to piston rod 35 a reciprocating motion.

Assuming that it is required to shift piston 45 in an upward direction, from its position shown in Fig. 2, it would necessarily be required to inject fluid through pipe 55, that is into the lowermost part of cylinder 37, and eject the fluid from the uppermost end of said cylinder 37 through pipe 56.

For the purpose of accomplishing the result last hereinabove mentioned it may be assumed that the slide member 58 must be in its uppermost shifted position, with lever 63 at position A. When pump 50 is set in operation through the action of motor 47 the fluid from reservoir 51 is sucked into the pump through pipe 52. The centrifugal action of pump 50 upon the liquid supplied thereinto through said pipe 52 is forced through pipe 53 into two-way valve 54 and from there through pipe 55 into the lower end of cylinder 37. Simultaneously pressure upon the fluid above piston 45 is borne thereon through said piston 45 by virtue of the upright shifting of the latter, and the fluid remaining above piston 45 is ejected from said cylinder 37 through pipe 56 into two-way valve 54 and from there through pipe 57 is returned to reservoir 51.

When piston rod 35 has been shifted in an upright direction to the fullest extent by the operation of the hydraulic mechanism last hereinabove described, piston 32 will have reached the utmost extent of its upright shifting movement, until it has come in contact with closure 15. By this time it has forced the contents of cylindrical casing 12 to be discharged through nozzle 30, in the sausage stuffing operation.

During the last described operation of the hydraulic mechanism it will be noted that pipe 53 was connected with pipe 55 through said two-way valve 54, and pipe 56 was connected with the return pipe 57 through said two-way valve 54.

In order to refill the contents of cylindrical casing 12 the downward shifting movement must be imparted to said piston rod 35 in order to bring piston 32 within the lower end of said cylindrical casing 12. In order to accomplish this purpose the reverse operation of the hydraulic mechanism from that last hereinabove described must be set in operation.

To do this slide member 58 is shifted to the lowermost position by bringing lever 63 to position B. Fluid is supplied as before from pump 50 to two-way valve 54 through pipe 53. Now however, due to the altered position of the slide member 58 connection has been established with pipe 56 through said two-way valve 54, so that fluid is forced through pipe 53 into pipe 56 to exert pressure upon piston 45 from above. Simultaneously fluid is ejected from the lower end of cylinder 37 through pipe 55, forcing the said fluid into the two-way valve 54. Connection between pipe 55 and return pipe 57 has been established through the last hereinabove mentioned position of slide member 58 in order to return to reservoir 51 the fluid through pipe 57 that was forced thereinto through pipe 55.

When the utmost downward shifted position of piston 32 has been established, lever 63 is shifted to its neutral position, indicated at C in Fig. 6. In this position the slide member 58 in the two-way valve 54 keeps the ends of pipes 55 and 56, connecting with said two-way valve 54, shut, while opening the corresponding ends of pipes 53 and 57, in order that the fluid forced from pump 50 through pipe 53 may be returned directly to reservoir 51 through return pipe 57.

When said piston 32 remains within the lower end of said cylindrical casing 12, the latter is in condition to be refilled. To do this, screw member 28 is loosened by the operation of handle 29. Thereupon bar 16 is swung horizontally upon its hinge 17—18—19, disengaging latch 22—25, for removing said bar 16 from above said closure 15. This permits the removal of said closure 15 from the upper end of said cylindrical member 12 for the purpose of refilling the latter through its upper open end.

Alternately the fluid in the hydraulic conduits may be propelled by means of a foot or hand operable pump. Such a pump is shown at 67 in Fig. 5 and may be operated by treadle 68 extended through cylindrical wall 46, or alternately by any suitable hand operated crank or the like. Suction pipe 69 connects with the bottom of reservoir 51 and leads to said pump 67. By centrifugal action of said pump 67 fluid is forced therefrom through pipe 70. The latter pipe connects with pipe 53 by means of cross 71, the latter being connected in said pipe 53 intermediately of its ends. Through said pipe 53 the fluid is injected into two-way valve 54, and therefrom into pipe 55 to act upon piston 45 from below in order to induce said piston to shift in an upward direction, causing simultaneous expulsion of fluid from the upper end of cylinder 37, that is from above of piston 45, through pipe 56, to return the fluid therethrough into the two-way valve 54, to be expelled therefrom through pipe 57 into reservoir 51. The operation last hereinabove described is of course on condition that the slide member 58 is properly set, in this instant extended upwardly by the operation of rod 60 when lever 63 is set at position A.

To shift piston rod 35 and piston 45 in a downward direction, lever 63 is set at position B for shifting slide member 58 to a downward direction. Operating pump 67, the reverse operation from that last hereinabove described takes place. Namely, through pipe 55 fluid is sucked into the two-way valve 54 from the lower end of cylinder 37, returning the fluid through pipe 57 to reservoir 51. Simultaneously through pipe 69 the fluid is sucked from reservoir 51 into pump 67 to be ejected therefrom into pipe 70, portion of pipe 53, and through the two-way valve 54 into pipe 56, to act upon piston 45 from above for shifting the latter in a downward direction.

Pressure gauge 72 is set upon pipe 53 intermediately of pump 50 and cross 71, to indicate the pressure fluid injected thereinto by pump 50, or in pipe 70 injected thereinto by pump 67, as the case may be. If there is too much pressure in pipe 53 or in pipe 70, as the case may be, too great a degree of pressure will be engendered either in pipe 55 or pipe 56 as the fluid ejected therefrom by either pump presses upon either side of piston 45, as the case may be. To do away with the excess of fluid which brings about the excess of the desired pressure in pipe 53 or pipe 70, as the case may be, and not to permit the said excess of fluid to find its way into the two-way valve 54 and therefrom into pipe 55 or pipe 56, as the case may be, suitable means is provided for by-passing by the excess amount of fluid of said two-way valve 54 and spilling the said excess amount of fluid directly into said reservoir 51.

The said means includes connecting pipe 73, which by one of its ends connects with cross 71 and by the other with T-joint 74. A pair of branch pipes 75 connect with said T-joint 74 by one of their ends, and by the opposite ends with pressure casing 76, wherein a suitable pressure reducing valve is located. Such pressure reducing valves are well known in various arts, and therefore the same is not shown in detail. Knob 77 connects with a shaft entering said casing 76 for controlling the pressure in the control spring bearing against the relief valve positioned within said casing 76. By-pass pipe 78 connects with said valve casing 76 by one of its ends, and by the other with fluid return pipe 57 through the medium of T-joint 79.

From the hereinabove description it will be clear that the pressure control valve in casing 76 may be regulated by the operation of knob 77 to bring about any desired degree of pressure in pipes 53 and 70, as the case may be, as may be indicated by gauge 72. Any excess amount of fluid in pipes 53 or 70 which brings about the excess pressure therewithin, and beyond the required degree of pressure as indicated by gauge 72, will be by-passed through pipes 78 and 57 and will spill itself through the latter pipe into said reservoir 51.

It is further observed that upward shifting movement of piston 45 is limited by piston 32 coming in contact with closure 15. In that position of piston 32, piston 45 remains in a spaced relation with cover 40, the two defining a pocket with which pipe 56 remains in communication, in order that the fluid may be injected through said latter pipe into said pocket and properly act upon said piston 45 from above. For a similar object the lower end of piston 45 is provided with lug 80 (Fig. 2) in order to maintain the lower end of piston 45 in a spaced relation with the bottom of base 38 in order that the two may define a pocket with which pipe 55 is in communication so that the fluid injected thereinto through said pipe 55 may properly act upon said piston 45 from below to shift said piston 45 in an upward direction.

The length of piston rod 35 is only sufficient for the purpose of shifting the upper end of piston 32 in contact with closure 15 when said piston 32 has been shifted in an upward direction. In order to properly clean said piston 32 and flush it with water so that no food particles may remain within the corner defined by the inner periphery of cylindrical casing 12 and the upper face of said piston 32, it may be required to elevate said piston 32 above and beyond the upper end of said cylindrical casing 12.

To accomplish the object last hereinabove mentioned piston rod 35 must be made longer. The upper end of piston rod 35 is provided with an axial socket 81. First said upper end of piston rod 35 is disengaged from the hollowed stud 34 on loosening screws 36. Access thereto is had through the door (not shown) in said cylindrical wall 46. Thereupon extension 82 is fitted over the upper end of said piston rod 35. Said extension 82 is provided at its lower end with a reduced lug 83 (Fig. 3) entering said socket 81. Said extension 82 is sufficiently long to permit the shifting of piston 32 beyond the upper end of cylindrical casing 12 for the purpose of washing and cleaning said piston 32. In fact once said piston 32 remains above said cylindrical casing 12 the former may be removed from said extension 82 and piston rod 35 for the purpose of very thorough scrubbing and washing. For the purpose described said extension 82 need not be rigidly connected with piston 32 by tightening said screws 36. Said extension 82 need not be rigidly connected with piston rod 35. Said extension 82 is merely an expedient for bringing piston 32 out of cylindrical casing 12 on imparting to said piston rod 35 an upward stroke by operation of the hydraulic mechanism aforesaid. After said piston 32 has been washed the same may be replaced together with extension 82 upon piston rod 35 and said rod 35 shifted downwardly. Thereupon through the door in said cylindrical wall 46 access may be had under said piston 32 for the purpose of removing said extension 82, replacing the upper end of piston rod 35 within the socket defined by said hollowed stud 34 and thereupon tightening screws 36 to recondition once more said piston 32 for operation after of course closure 15 and bar 16 had been replaced.

Rod 84 in a rigid relation with closure 15 upwardly projects from the latter. The same affords means for manually grasping for removing said closure 15. Also, when latch 22—25 is in an operative position, and before screw 28 has been tightened said rod 84 may be shifted towards said bar 16 until the former comes in contact with the latter to indicate that all parts are in a mutually operated position before screw 28 is tightened to bear against said closure 15.

While there are described herein preferred embodiments of the present invention, it is nevertheless to be understood that minor changes may be made therein without departing from the spirit and scope of the invention as claimed.

What I claim as new is:

1. A sausage stuffing machine comprising a cylindrical casing having an outlet in a side thereof, a closure removably secured to the upper end of the casing, an ejecting piston mounted in the casing for ejecting the contents through said outlet, a base, a power cylinder mounted on the base below the casing, a power piston in the power cylinder and connected with the ejecting piston, and means for operating said power piston including a fluid reservoir, a pump, a conduit connecting the reservoir and pump, a valve having conduit means connecting the same with the power cylinder at opposite ends of said cylinder, and conduits connecting said valve with the pump and reservoir respectively.

2. A sausage stuffing machine comprising a cylindrical casing having an outlet in a side thereof, a closure removably secured to the upper end of the casing, an ejecting piston mounted in the casing for ejecting the contents through said outlet, a base, a power cylinder mounted on the base below the casing, a power piston in the power cylinder and connected with the ejecting piston, means for operating said power piston including a fluid reservoir, a pump, a conduit connecting the reservoir and pump, a valve having conduit means connecting the same with the power cylinder at opposite ends of said cylinder, conduits connecting said valve with the pump and reservoir respectively, and a pressure reducing valve connected with the supply conduit from the pump to the first-mentioned valve for reducing excess pressure supplied to the power cylinder.

References Cited in the file of this patent

UNITED STATES PATENTS

| | | |
|---|---|---|
| 343,077 | Siereveld et al. | June 1, 1886 |
| 400,323 | Geyer | Mar. 26, 1889 |
| 894,039 | Napier | July 21, 1908 |
| 1,295,809 | Stallman | Feb. 25, 1919 |
| 2,308,400 | Sundholm | Jan. 12, 1943 |
| 2,330,496 | Kidd | Sept. 28, 1943 |

FOREIGN PATENTS

| | | |
|---|---|---|
| 176,697 | Germany | Oct. 23, 1906 |